June 27, 1944.  W. MELIN  2,352,489
DEVICE FOR MACHINING ENDS OF ARTICLES
Filed Jan. 19, 1942  2 Sheets-Sheet 1

Inventor
William Melin
Barthel & Bugbee
Attorneys

June 27, 1944.   W. MELIN   2,352,489
DEVICE FOR MACHINING ENDS OF ARTICLES
Filed Jan. 19, 1942   2 Sheets-Sheet 2
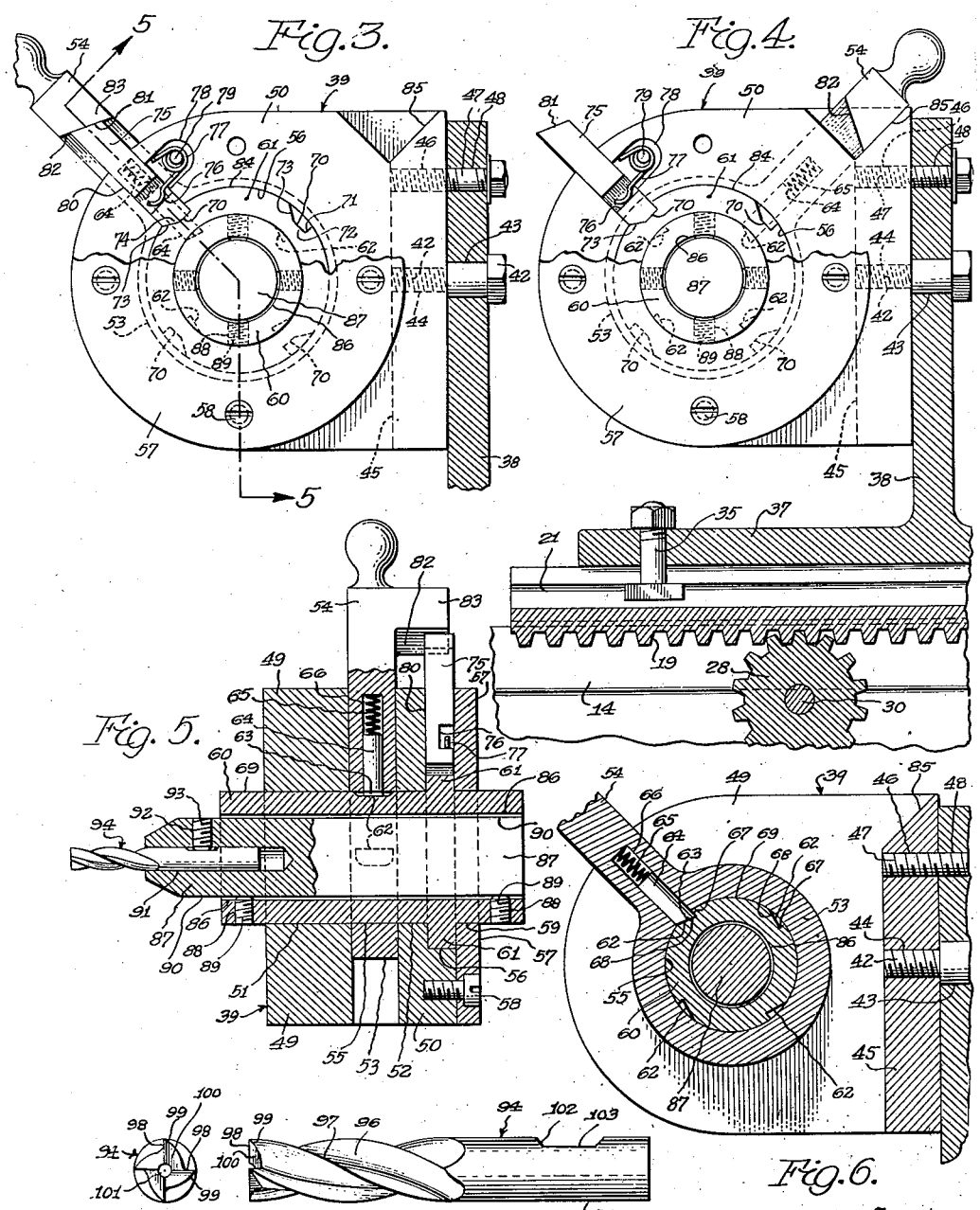
Inventor
William Melin
By Barthel & Bugbee
Attorneys Patented June 27, 1944

2,352,489

UNITED STATES PATENT OFFICE 2,352,489

DEVICE FOR MACHINING ENDS OF ARTICLES

William Melin, Detroit, Mich.

Application January 19, 1942, Serial No. 427,278

12 Claims. (Cl. 90—56)

This invention relates to machine tools, and in particular to devices for machining the ends of articles, such as end mills.

One object of this invention is to provide a device for machining inclined portions or lips upon the ends of articles, such as the cutting edges of end mills.

Another object is to provide a device for machining the lips at the ends of end mills wherein means is provided for accurately locating each place to be machined at a definite predetermined position and locking it in that position without danger of its being locked in any intermediate position.

Another object is to provide a device for machining the ends of end mills wherein a rotary holder is so constructed and arranged that the end mill is rotated by the operator successively to position the ends of each of its flutes in the same position relatively to the milling cutter or machining tool, the device being provided with means which locks the holder in position only after a complete stroke of the positioning handle has been made by the operator, or a succession of partial strokes which add up to a complete stroke.

Another object is to provide a device for machining the ends of end mills, including a holder for the end mills which is quickly and accurately rotated from one position to another to place the ends of its flutes successively in proper alignment relatively to the milling cutter or machining tool and to lock the holder in such positions without any thought or skill upon the part of the operator, yet locking it only in predetermined positions and no others, thereby preventing any shifting of the end mill during the cutting operation.

In the drawings:

Fig. 3 is a right-hand end elevation partly in section of the article holder of the device shown in Fig. 2, with the shifting handle in its rearward or locking position.

Fig. 4 is a right-hand elevation similar to Fig. 3 but with the shifting handle in its forward position, in section along the line 4—4 in Fig. 1.

Fig. 5 is a longitudinal section along the line 5—5 in Fig. 3.

Fig. 6 is a cross-section along the line 6—6 in Fig. 1.

Fig. 7 is a side elevation of an end mill of the type adapted to be machined in the device of the present invention.

Fig. 8 is a left-hand end elevation of the end mill shown in Fig. 7.

In general, the device of the present invention consists of a holder for the article the end of which is to be machined, this holder being tiltably mounted upon a bracket which may be moved so as to cause the end of the article to be moved across the path of the cutter. The holder is also provided with means for rotating the article between cutting strokes, so as to successively present one at a time of a plurality of such end positions and to lock the article successively in these positions so that it is immovable during the cutting operation yet can be instantly released and moved to the next position without any thought or skill on the part of the operator.

For this purpose, the article to be machined is mounted in a sleeve which is provided with two rows of peripherally spaced notches each having a number of notches corresponding to the number of end portions to be machined. One row of these notches is engaged by a shifting pawl in an operating handle whereas the other row is engaged by a locking pawl which is locked by the handle when it is in its normal or rearward position but unlocked when the handle is moved forward by the operator into its forward position during a shifting stroke of the handle.

Thus the sleeve and the end mill or other article to be machined are firmly locked in each position corresponding to each locking notch and can only be locked in these positions when a complete stroke of the shifting handle has been made, or a series of partial strokes which add up to a complete stroke. It is, therefore, impossible to lock the article in position after a partial stroke; hence, it is impossible to hold the article in an intermediate position and to machine it in such intermediate position.

Hitherto, the precise machining of the ends of articles such as end mills has required extremely skilled operators in order to perform accurately the successive adjustment necessary for accurately positioning each of the flutes of the end mills relatively to the cutter which backs off the ends of the flute to form the lips which constitute the cutting edges of the end mills. Such skilled labor is not only very expensive but also limited in supply, and the necessarily accurate positioning operations consume an excessive amount of time, so that the cost of the article is high. The present device, however, takes the skill out of the operator and puts it into the machine, with the result that an unskilled operator can accurately position and cut the ends of the article quickly and efficiently in less time than can be done by a skilled operator using prior machines and methods.

Figure 1:
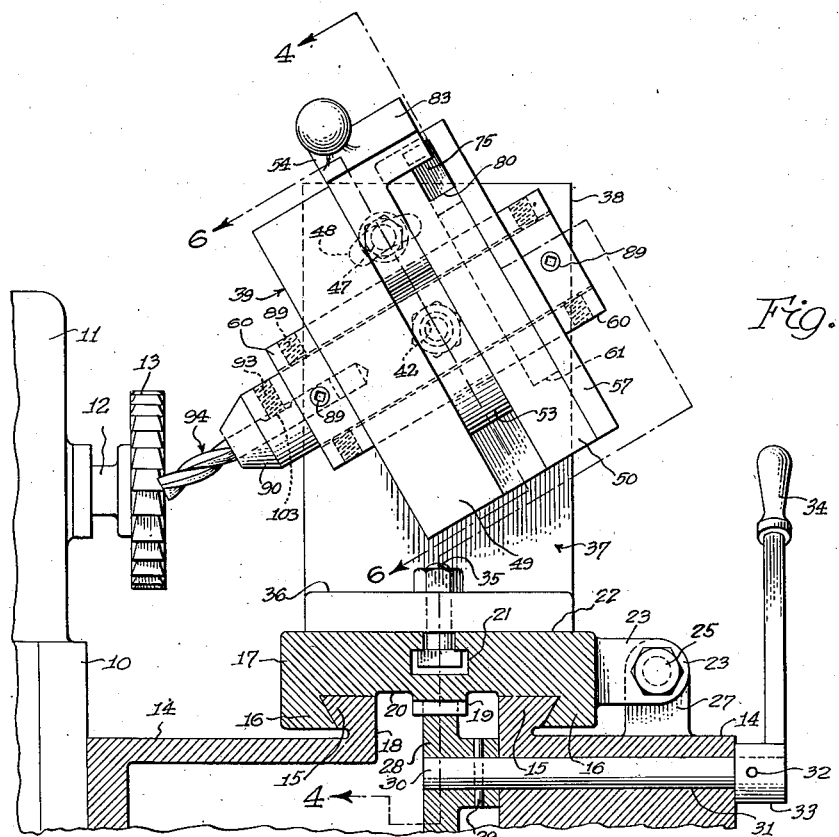
Fig. 1 is a front elevation, partly in section, of a preferred embodiment of a device for machining the ends of articles according to the invention.

Referring to the drawings in detail, Fig. 1 shows a preferred form of the machine of the invention as consisting of a base 10 having a head 11 in which is journalled a rotatable shaft 12 carrying a rotary milling cutter 13. The milling cutter 13 may be replaced by a grinding wheel for grinding operations in certain classes of work, such grinding wheels being contemplated as included in the use of the term "cutter."

Figure 2:
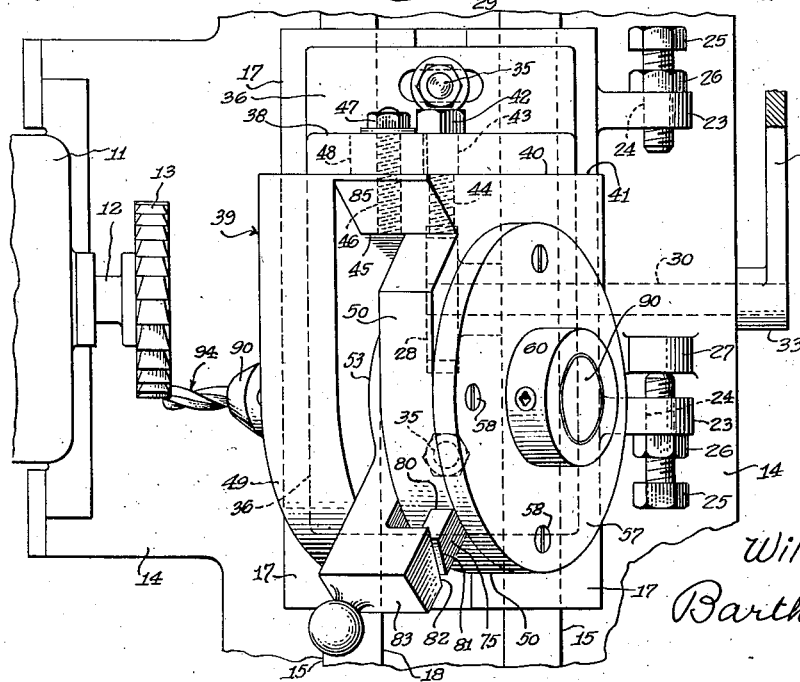
Fig. 2 is a top plan view of the device shown in Fig. 1.

The base 10 is provided with a horizontal extension 14 having upstanding dovetailed ways 15 engaging the corresponding portion 16 of a carriage 17. It will be seen from Figures 1 and 2 that the horizontal extension 14 is slidable vertically relatively to the base 10. This adjustment forms no part of the present invention, and is for the purpose of accurately locating the workpiece 94 in the proper position vertically relatively to the cutter 13. The ways 15 are separated from one another by an open space 18 (Fig. 1) into which projects a toothed rack 19 (Fig. 4) extending downwardly from the bottom surface 20 of the carriage 17. The latter is provided with a T-shaped slot 21 extending longitudinally along the upper surface 22 of the carriage 17, and serving as an anchorage for various devices which are to be mounted upon the carriage. The carriage 17 is also provided with a pair of spaced horizontally extending projections 23 (Fig. 2) each having a threaded bore 24 carrying a stop screw 25 and a lock nut 26. The ends of the stop screws 25 are adapted to engage the opposite sides of a stop 27 which projects upwardly from the base extension 14.

Meshing with the rack 19 on the carriage 17 (Figs. 1 and 4) is a pinion 28 secured as at 29 to a shaft 30 journalled in the bore 31 of the base extension 14. Secured as at 32 to the outer end of the shaft 30 is the hub 33 of an operating lever 34. It will be apparent that by swinging the operating lever to and fro, the carriage 17 will be moved to and fro along the dove-tailed ways 15 by the action of the pinion 28 upon the rack 19.

Mounted upon the top surface 22 of the carriage 17 and secured thereto by the anchor bolts 35 engaging the T-slot 21, is the horizontal portion 36 of an angle bracket 37, the vertical portion 38 of which serves as a face plate for carrying the article holder, generally designated 39. The contacting surfaces 40 and 41 respectively of the face plate 38 and holder 39 are accurately machined so that the one may be swivelled relatively to the other around a pivot bolt 42 as an axis. The latter passes through a smooth bore 43 in the face plate 38 and into a threaded bore 44 in the end plate 45 of the holder 39 (Fig. 6). The end plate 45 is also provided with a threaded bore 46 which receives a clamping bolt 47, the outer portion of which passes through an arcuate slot 48 in the head plate 38 (Fig. 1). By this means the holder 39 may be rotated slightly around the axis of the pivot bolt 42 and clamped in position against the head plate 38 by means of the clamping bolt 47.

The holder 39 is provided with a pair of spaced parallel side plates 49 and 50 projecting forwardly from the end plate 45 (Fig. 2) and having coaxial bores 51 and 52 (Fig. 5). Mounted between the side plates 49 and 50 is the hub 53 of the shifting handle 54 and provided with a bore 55 coaxial with the bores 51 and 52. The end plate 50 is likewise provided with an annular recess 56 closed by an annular retaining plate 57 secured to the end plate 50 by the set screws 58 and having a bore 59 coaxial with the bores 51, 52, and 55.

Rotatably mounted in the coaxial bores 51, 52, 55, and 59 is a sleeve 60 having an annular flange 61 mating with the recess 56 in the end plate 50. The sleeve 60 is provided with a plurality of peripheral ratchet notches 62 (Fig. 6) of wedge-shaped configuration and engaged by the end 63 of a pawl 64 backed by a coil spring 65 and reciprocable within the bore 66 in the shifting handle 54. The end 63 of the pawl 64 is bevelled to fit the notches 62 so that when the handle 54 is swung forwardly (Figs. 4 and 6) the tip of the pawl will engage the forward end shoulder 67 of the notch 62 and swing the sleeve 60 in a clockwise direction. When the handle 54 is swung rearwardly, however, from the position of Fig. 4 to that of Fig. 3, the end 63 of the pawl 64 will ride up the inclined bottom wall 68 of the notch 62 and slip along the outer surface 69 of the sleeve 60, leaving the latter motionless.

In order to hold the sleeve 60 motionless during retraction of the shifting handle 54, the annular flange 61 is also provided with a series of peripherally spaced locking notches 70 (Fig. 3) each having a forward shoulder 71, a flat bottom wall 72 and an inclined portion 73, these portions being engaged by the correspondingly shaped portions on the end 74 of a locking pawl 75. The latter is provided with a transverse slot 76 engaged by one end of a spring 77 housed in a recess 78 in the side plate 50 (Figs. 3 and 4) around a pin 79 seated therein and having its opposite end abutting the side walls of the recess 78. The spring 77 thus urges the locking pawl 75 inwardly along the radial slot 80 in the side plate 50. The upper end of the locking pawl 75 is bevelled as at 81 and is engaged by the correspondingly bevelled surface 82 of the overhanging portion 83 extending sidewise from the shifting handle 54. As a consequence, when the shifting handle 54 is in its normal or rearward position (Fig. 3), the locking pawl 75 is firmly held with its end 74 in one of the locking notches 70 by the coaction of the inclined surfaces 81 and 82. When the handle 54 is moved to its forward position (Fig. 4), however, the inclined overhanging surface 82 of the handle 54 moves off the inclined end 81 of the locking pawl 75, leaving the inclined end 74 of the latter free to ride up the inclined portion 73 and out of the notch 70, sliding along the peripheral surface 84 of the flange 61. When the shifting handle 54 has been returned to its rearward or locking position (Fig. 3), however, the locking pawl 75 is firmly locked in the notch 70 and the coaction of the end 74 of the pawl 75 with the shoulder 71 at the forward end of the notch 70 prevents rotation of the sleeve 60 under the influence of the torque imparted thereto by the cutter 13.

The end plate 45 along its upper edge is provided with an inclined surface 85 adapted to be engaged by the side of the handle 54 in its forward position (Fig. 4), thereby serving as a stop to limit the forward throw of the handle 54.

The sleeve 61 is provided with an internal bore 86 which loosely receives a cylindrical adapter 87

(Fig. 5) of smaller diameter. The sleeve 60 is provided with threaded radial slots 88 adapted to receive the adjusting screws 89, the inner ends of which engage the outer surface 90 of the adapter 87. By loosening certain of the adjusting screws 89 and tightening others, the adapter 87 may be centered accurately within the bore 86. The adapter 87 at its left-hand end (Fig. 5) is provided with a longitudinal socket 91 and a radial threaded bore 92 containing a set screw 93 for locking the article 94 within the socket 91.

The article 94 constituting the work-piece to be machined is shown as consisting of an end mill having a cylindrical body 95 (Fig. 7) and a plurality of spiral flutes 96 separated from one another by spiral grooves 97 and terminating in cutting edges 98 on lips 99 having inclined surfaces 100. A bore 101 is formed in the end of the end mill 94 and separates the cutting edges 98 from each other. The body 95 of the end mill 94 is provided with an elongated notch 102 having a flat portion 103 for receiving the lower end of the set screw 91 of the adapter 90.

The operation of the machine has already been described to some extent in connection with the construction thereof. Assuming that the holder 39 has been tilted at the correct angle upon the face plate 38, that the stop screws 25 have been correctly adjusted for the proper length of stroke of the carriage 17, and that the adapter 90 has been properly centered in the bore 86 of the sleeve 60, the operator selects a work-piece, such as an end mill 94, and places it in the socket 91, locking it in position by forcing the set screw 93 into the notch 102 with its end firmly against the flat portion 103. During the insertion of the work-piece it is assumed that the shifting handle 54 is in its normal or retracted position (Fig. 3). The action of the locking pawl 75 in the locking notches 70 of the sleeve 60 prevents the latter from rotating while the handle 54 is in its retracted position.

To make the first cut, and back off the end of one of the lips 96 of the work-piece 94, the operator now swings the operating lever 34 forwardly causing the carriage 17 to move forward and carry the work-piece 94 into engagement with the rotating cutter 13. The operator presses upon the lever 34 to feed the work-piece into the cutter 13, which thereby backs off the end of the flute 96 to form the inclined surface 100 and cutting edge 98 on the lip 99. When the cutting operation is complete the forward stop screw 25 (Fig. 2) engages the forward surface of the stop 27 and halts the carriage 17. The operator then retracts the carriage 17 by pulling back upon the operating lever 34.

To rotate the work-piece into the next position so as to present the next end 99 of the next flute 96 to the rotary cutter 100, the operator now swings the shifting handle 54 from its retracted position (Fig. 3) to its forward position (Fig. 4) and back again. At the beginning of the forward stroke, the inclined surface 82 on the handle overhang 83 moves off the inclined surface 81 at the upper end of the locking pawl 75, freeing the latter. At approximately the same time, the shifting pawl 64 engages the ratchet notch 62 (Fig. 6) and swings the sleeve 60 in a clockwise direction. When this occurs, the inclined end 74 of the locking pawl 75 rides up the inclined portion 73 of the notch 70 and out of the latter, sliding along the periphery 84 of the flange 61 on the sleeve 60 until it drops into the next notch 70 as the handle 54 comes into engagement with the stop surface 85 (Fig. 4). When the handle is pulled back by the operator into its retracted position (Fig. 3) the locking pawl 74 under the urge of the spring 77 holds the sleeve 60 motionless while the inclined lower end 63 of the shifting pawl 64 rides up the inclined portion 68 of the notch 62 and slides along the periphery 69 of the sleeve 60, which is meanwhile being held motionless by the locking pawl 75. When the shifting handle 54 reaches its retracted position, its overhanging inclined surface 82 engages the inclined end 81 of the rocking pawl 75 and firmly holds the latter in its locking position.

The operator now swings the operating handle 34 through a second stroke, feeding the work-piece 94 into engagement with the rotary cutter 13, and repeating the foregoing operation. By this means a series of back-off surfaces 100 and cutting edges 98 is formed upon the end lips 99 of the flutes 96 without the necessity of any close attention thereto upon the part of the operator. The shifting handle 54 must either be swung through a full forward stroke or a plurality of partial forward strokes before the sleeve 60 will become locked in its next position, hence there is no danger of a false intermediate position being machined because the sleeve 60 is unlocked at such intermediate positions. After the flutes have been machined in this manner and the requisite number of cutting edges 98 produced, the work-piece 94 is removed from the socket 91 by loosening the set screw 93. A new work-piece may then be inserted and located accurately by means of its flat portion 103 and the set screw 93. While the device is shown as adjusted for backing off the end of four-flute end mills, it may be used for backing off two-flute end mills merely by operating the shifting handle 54 twice for each positioning operation thus swinging the sleeve 60 and work-piece 94 through 180 degrees instead of through 90 degrees. The notches 62 and 70 may obviously be spaced at different intervals in order to provide for the machining of work-pieces with different numbers of flutes 96.

While I have shown and described my invention in detail, it is to be understood that the same is to be limited only by the appended claims for many changes may be made without departing from the spirit and scope of the invention.

What I claim is:

1. In a device for machining the ends of articles, a base, a rotatable work-holder mounted on said base, said work-holder having a plurality of peripherally-spaced detent-engaging portions associated therewith, a work-holder shifter movably mounted adjacent said work-holder, releasable detent means on said shifter releasably engageable with said portions, a second detent engaging within another set of peripherally-spaced detent-engaging portions and cooperative engageable cam faces on said second-mentioned detent and shifter for locking the work-holder in adjusted position.

2. In a device for machining the ends of articles, a base, a rotatable work-holder mounted on said base, said work-holder having a plurality of peripherally-spaced detent-engaging portions associated therewith, a work-holder shifter movably mounted adjacent said work-holder, releasable detent means on said shifter releasably engageable with said portions, a second detent engageable in another set of peripherally-spaced detent-engaging portions and cooperating cam faces on said shifter and second detent for locking said work-holder in one of a plurality of spaced cutting positions.

3. In a device for machining the ends of articles, a base, a rotatable work-holder mounted on said base, said work-holder having a plurality of peripherally spaced notches, a work-holder shifter movably mounted adjacent said work-holder and having a detent releasably engageable with said notches, and another detent engageable in another series of peripherally-spaced detent-engaging portions, said second detent having a cam face on one end for being engaged by a cooperating cam surface on said work-holder shifter.

4. In a device for machining the ends of articles, a base, a rotatable work-holder mounted on said base, said work-holder having a pair of circumferentially-spaced notches, a work-holder shifter movably mounted adjacent said work-holder and having a detent releasably engageable within one of said pair of notches, and a detent engageable with the other of said pair of notches and responsive to the rotation of said work-holder and engageable by said shifter for locking said work-holder in one of a plurality of spaced cutting positions, said work-holder shifter having a projection thereon with a wedge surface for engaging the end of said second-mentioned detent.

5. In a device for machining the ends of articles, a base, a rotatable work-holder mounted on said base, a work-holder shifter movably mounted adjacent said work-holder, said work-holder having a plurality of sets of circumferentially-spaced notches and detents arranged for engagement therewith, and locking means responsive to the rotation of said work-holder through a predetermined angle by the engagement of one of said detents with a notch of one of said sets for locking said work-holder by the engagement of another of said detents with a notch of another of said sets, and said locking means comprising a projection on the shifter having a cam face engageable with the end of the work-holder detent when said shifter is in a position for a cutting operation.

6. In a device for machining the ends of articles, a base, a rotatable work-holder mounted on said base, a work-holder shifter movably mounted adjacent said work-holder, said work-holder having a plurality of circumferentially-spaced notches and a detent arranged for engagement therewith and operative in one direction of motion of said shifter to shift said work-holder and in another direction to move relatively thereto, and a second set of circumferentially-spaced notches on said work-holder engageable by another detent and responsive to a predetermined travel of said shifter and engageable with a projection thereon having a cam face for locking said work-holder in its attained position.

7. In a device for machining the ends of articles, a base, a rotatable work-holder mounted on said base, a work-holder shifter movably mounted adjacent said work-holder, said work-holder and said shifter having a plurality of circumferentially-spaced notches and a detent arranged therebetween and operative in one direction of motion of said shifter to shift said work-holder and in another direction to move relatively thereto, and a second detent engageable with another set of spaced notches on said work-holder having a cam end portion engageable by said shifter responsive to a predetermined travel of said shifter in one direction for locking said work-holder in its attained position.

8. In a device for machining the ends of articles, a base, a rotatable work-holder mounted on said carriage, a work-holder shifter movably mounted adjacent said work-holder, said work-holder and said shifter having a plurality of circumferentially spaced notches and a detent arranged therebetween and operative in one direction of motion of said shifter to shift said work-holder and in another direction to move relatively thereto, a second set of notches in said work-holder engageable by another detent and responsive to a predetermined travel of said shifter in one direction for locking said work-holder in its attained position, and a cam surface on the free end of said second detent engageable by a complementary surface on said shifter whereby a predetermined travel of said shifter in one direction will additionally lock said locking means.

9. In a device for machining the ends of articles, a base, a rotatable work-holder mounted on said base, a work-holder shifter movably mounted adjacent said work-holder, said work-holder and said shifter having a plurality of circumferentially-spaced notches and a detent arranged therebetween and operative in one direction of motion of said shifter to shift said work-holder and in another direction to move relatively thereto, said work-holder having a second set of circumferentially-spaced notches, a locking member engageable with said notches, and a projection on the shifter engageable with the upper end of the locking member for retaining the work-holder in a cutting position.

10. In a device for machining the ends of articles, a base, a rotatable work-holder mounted on said base, a work-holder shifter movably mounted adjacent said work-holder, said work-holder and said shifter having a plurality of circumferentially-spaced notches and a detent arranged therebetween and operative in one direction of motion of said shifter to shift said work-holder and in another direction to move relatively thereto, means responsive to a predetermined travel of said shifter in one direction to rotate said work-holder into a locked position, and a second set of circumferentially-spaced notches on the work-holder engageable by another detent on said base, said second-mentioned detent having a wedge surface adapted to be engaged by a similar surface on a projection carried by said shifter to additionally lock said locking means.

11. In a device for machining the ends of articles, a base, a rotatable work-holder mounted on said base, a work-holder shifter movably mounted adjacent said work-holder, said work-holder having a plurality of sets of circumferentially-spaced notches, a pawl on said shifter engageable with one set of notches to rotate said work-holder in response to the motion of said shifter in one direction and movable relatively thereto in the opposite direction, and a locking pawl engageable with another set of said notches and engageable by the shifter for locking said work-holder in a predetermined attained position, said shifter having a projection provided with an inclined surface adapted to be engaged by an inclined surface on said locking pawl when said shifter is moved to said predetermined attained position.

12. In a device for machining the ends of articles, a base, a rotatable work-holder mounted on said base, a work-holder shifter movably mounted adjacent said work-holder, said work-holder having a plurality of sets of circumferentially-spaced notches, a pawl on said shifter engageable with one set of said notches to rotate said work-holder in response to the motion of said shifter in one direction and movable relatively thereto in the opposite direction, a locking pawl engageable with another set of said notches for locking said work-holder in a predetermined attained position, and a projection on said shifter having a cam surface engageable with a complementary surface on said locking pawl for additionally locking said locking pawl and preventing the rotation of said work-holder when positioned for a work cutting operation.

WILLIAM MELIN.